(12) United States Patent
Hoermann et al.

(10) Patent No.: US 10,974,623 B2
(45) Date of Patent: Apr. 13, 2021

(54) MEANS OF TRANSPORTATION

(71) Applicant: MAGNA STEYR Fahrzeugtechnik AG & Co KG, Graz (AT)

(72) Inventors: Reinhard Hoermann, Hitzendorf (AT);
Franz Planka, St. Andrae (AT);
Wolfgang Passegger, Tillmitsch (AT)

(73) Assignee: MAGNA STEYR Fahrzeugtechnik AG & Co KG, Graz (AT)

( * ) Notice: Subject to any disclaimer, the term of this patent is extended or adjusted under 35 U.S.C. 154(b) by 126 days.

(21) Appl. No.: 16/290,296

(22) Filed: Mar. 1, 2019

(65) Prior Publication Data
US 2019/0329678 A1    Oct. 31, 2019

(30) Foreign Application Priority Data

Apr. 26, 2018  (EP) .................... 18169479

(51) Int. Cl.
*B60N 2/30* (2006.01)
*B60J 7/00* (2006.01)
*B60P 1/64* (2006.01)

(52) U.S. Cl.
CPC .......... *B60N 2/3034* (2013.01); *B60J 7/0015* (2013.01); *B60P 1/6409* (2013.01)

(58) Field of Classification Search
CPC ..... B60N 2/3034; B60P 1/6409; B60J 7/0015
See application file for complete search history.

(56) References Cited

U.S. PATENT DOCUMENTS 5,110,171 A      5/1992  Anthony
7,597,373 B2 *  10/2009  McAuliffe, Jr. ...... B60R 13/011
                                                          296/39.1

FOREIGN PATENT DOCUMENTS

DE       10016946 A1    7/2001
DE       10233745 A1    2/2004

* cited by examiner

*Primary Examiner* — D Glenn Dayoan
*Assistant Examiner* — Melissa Ann Bonifazi
(74) *Attorney, Agent, or Firm* — Jordan IP Law, LLC; Todd A. Vaughn (57) ABSTRACT

A transport vehicle that includes at least one seat to receive passengers thereon, the at least one seat being moveable between a non-stowed position permitting a passenger to sit thereon, and a space-saving stowed position to permit a transport of goods. A cover is provided and moveable between a non-operating position and an operating position to at least partially cover at least one side wall of the motor vehicle and also the at least one seat in the space-saving stowed position.

18 Claims, 12 Drawing Sheets

MEANS OF TRANSPORTATION

CROSS-REFERENCE TO RELATED APPLICATIONS

The present application claims priority under 35 U.S.C. § 119 to European Patent Publication No. EP 18169479.5 (filed on Apr. 26, 2018), which is hereby incorporated by reference in its complete entirety.

TECHNICAL FIELD

Embodiments relate to a transport vehicle, in particular, a motor vehicle for the transport of passengers and the transport of goods.

BACKGROUND

It is known that vehicles may be used for the transport of passengers and goods. The problem here is that seats are required when conveying passengers, said seats being obstructive when transporting goods. When transporting goods there is the risk that damage and/or dirt may appear on the vehicle.

A collapsible lining for estate cars, minibuses and the like is disclosed in German Patent Publication No. DE 10016946A1. In this case, the collapsible lining is loaded into the vehicle provided therefor and folded open and subsequently removed again from the vehicle when the vehicle is provided for the transport of passengers.

SUMMARY

Embodiments relate to a transport vehicle which is suitable for the transport of passengers and the transport of goods. In this case, in particular, damage or dirt due to the transport of goods is designed to be prevented.

In accordance with embodiments, a transport vehicle such as, for example, a motor vehicle for the transport of passengers and the transport of goods, may comprise: at least one seat which is moveable between a non-stowed position permitting a passenger to sit thereon, and a space-saving stowed position; and a cover which is moveable between a collapsed or non-extended position and a folded-out or extended position in which the cover at least partially covers at least one side wall of the transport vehicle and also the seat in the space-saving stowed position.

In accordance with embodiments, a transport vehicle such as, for example, a motor vehicle for the transport of passengers and the transport of goods, comprising: at least one seat which is moveable into a space-saving stowed position; and a cover which is moveable to a folded-out or extended position to at least partially cover the seat in the space-saving stowed position and at least one side wall of the transport vehicle.

In accordance with embodiments, via such a cover, a transport vehicle which is optimized both for the transport of passengers and for the transport of goods may be designed in a simple manner. By moving the at least one seat into a space-saving stowed position and moving the cover to a folding-out or extended position, the transport vehicle may be provided for the transport of goods such that the seat and the at least one side wall, or alternatively, all side walls of the transport vehicle, are not damaged or soiled by the transported goods. The seat, in turn, may remain in the transport vehicle by being moved into a space-saving stowed position without using space and interfering with the space for the goods to be transported.

In accordance with embodiments, the at least one seat may be moved into the floor of the transport vehicle and into the space-saving stowed position, for example, by being folded away and/or pulled in and/or retracted and/or folded down.

Alternatively, in accordance with embodiments, the at least one seat may also be folded away and/or pulled in and/or retracted and/or folded down toward a side wall, preferably a lateral side wall.

In accordance with embodiments, a side wall of the transport vehicle which, in the vehicle longitudinal direction, is located to the left or right of the direction of travel of the transport vehicle, is denoted as a lateral side wall.

Advantageously, in accordance with embodiments, the transport vehicle may comprise a plurality of seats which are moveable into a space-saving stowed position; and a cover to cover the plurality of seats in the space-saving stowed position.

In accordance with embodiments, in a folded-out or extended position of the cover, at least one lateral side wall of the transport vehicle is at least partially covered.

In accordance with embodiments, in a folded-out or extended position of the cover, all four side walls of the transport vehicle are at least partially covered.

In accordance with embodiments, in a folded-out or extended position of the cover, at least one side wall of the transport vehicle is covered by at least 50%.

In accordance with embodiments, in a folded-out or extended position of the cover, all four side walls of the transport vehicle is covered by at least 50%.

In accordance with embodiments, in a folded-out or extended position of the cover, at least one side wall of the transport vehicle is entirely covered.

In accordance with embodiments, in a folded-out or extended position of the cover, all four side walls of the transport vehicle is entirely covered.

In accordance with embodiments, the cover may also take on a decorative purpose, for example, by having decorative patterns printed thereon.

In accordance with embodiments, in a folded-out or extended position of the cover, the seat(s) are moveable into a stowed position, and the floor of the transport vehicle that is adjacent to the seats is at least partially covered.

In accordance with embodiments, in a folded-out or extended position of the cover, the seat(s) are moveable into a stowed position, and the floor of the transport vehicle that is adjacent to the seats is entirely covered.

In accordance with embodiments, a transport vehicle comprises a floor having a large recess (e.g., a recess that is large in surface area) to receive the seats. This advantageously results in the part of the cover which covers the seats does not have to be configured to be substantially capable of carrying the weight of the goods during transport.

In accordance with embodiments, a transport vehicle comprises a floor having a plurality of small recesses (e.g., each recess that is small in surface area) which are sufficiently sized to receive the seats. This advantageously results in the part of the cover which covers the seats does not have to be configured to be substantially capable of carrying the weight of the goods during transport.

In accordance with embodiments, the cover is only able to be folded out and/or extended when the seat(s) are moved into the space-saving stowed position. As a result, damage that may occur to the cover and/or the seats is prevented.

In accordance with embodiments, the kinematics of the seat(s), which are moveable into a stowed position, may be configured to cooperate or correspond directly with the kinematics of the cover. Moving the seats into the space-saving stowed position may simultaneously trigger the folding out or extending of the cover via a common actuating element, and vice-a-versa.

In accordance with embodiments, each cover comprises a roller blind.

In accordance with embodiments, each cover comprises a separate roller blind for at least one side wall and also for the floor region.

In accordance with embodiments, each cover comprises a separate roller blind for each side wall and also for the floor region.

In accordance with embodiments, the cover comprises a folding mechanism, i.e., cover elements which are connected via a folding mechanism.

In accordance with embodiments, in a collapsed state, the cover is arranged in the region of the roof lining of the transport vehicle.

In accordance with embodiments, the cover comprises a plurality of side walls and a floor.

In accordance with embodiments, the folding mechanism is retained via closure elements in the region of the roof lining and/or in the folded-out state in the floor region of the transport vehicle.

DRAWINGS

Embodiments will be illustrated by way of example in the drawings and explained in the description below.

DESCRIPTION

As illustrated in FIGS. 1 through 6B, a first example of a transport vehicle is provided, in accordance with embodiments.

Figure 1:
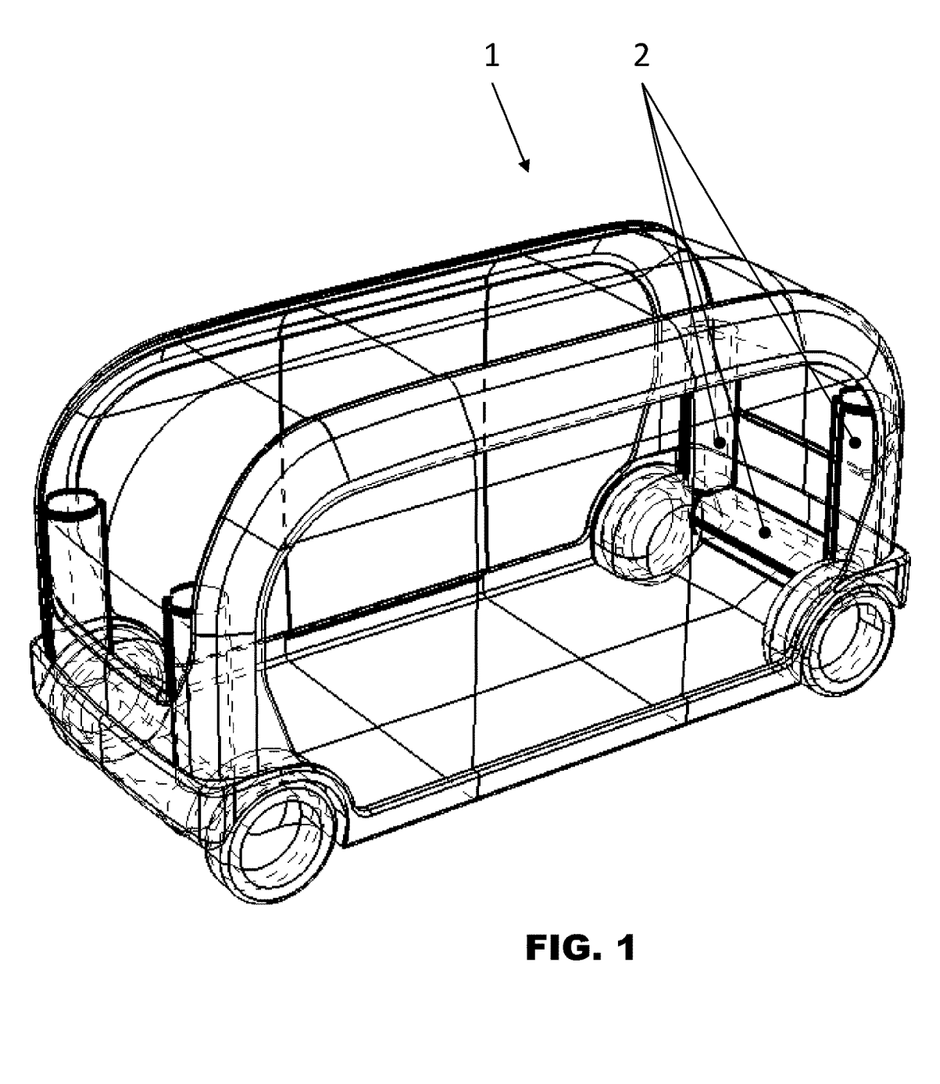
FIG. 1 illustrates a perspective view of a transport vehicle, with a roller blind in a retracted position, in accordance with embodiments.

As illustrated in FIG. 1, in a perspective view, a transport vehicle 1 comprises a roller blind 2 which serves as the cover. In accordance with embodiments, a roller blind 2 is provided for each lateral side wall or each side wall and/or the floor of the transport vehicle 1. In this view, the roller blinds 2 are illustrated in the retracted position or state, i.e., the side walls and/or the floor are exposed (uncovered). The seats 4 of the transport vehicle 1 are not illustrated for the sake of greater clarity.

Figure 2:
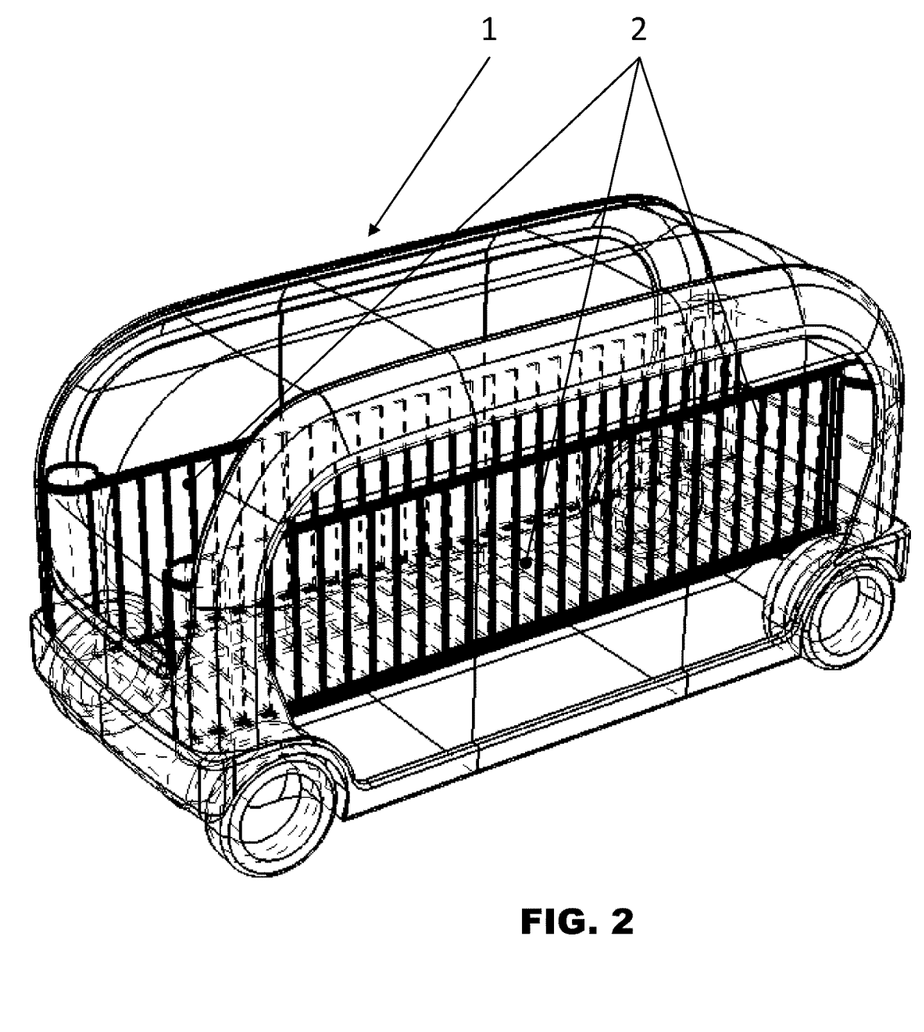
FIG. 2 illustrates a perspective view of a transport vehicle with a roller blind in an extended position, in accordance with embodiments.

As illustrated in FIG. 2, the roller blind 2 is in an extended state. A hollow space is configured between the floor of the transport vehicle 1 and the cover of the roller blind 2 for the floor in order to receive the seat(s) 4 (not illustrated). Meaning, the seat(s) 4 are moveable into the hollow space, and thus, into the stowed position. The side surfaces to the front and rear are shown uncovered, but depending on the embodiment, may be at least partially covered via the roller blind 2.

Figure 3:
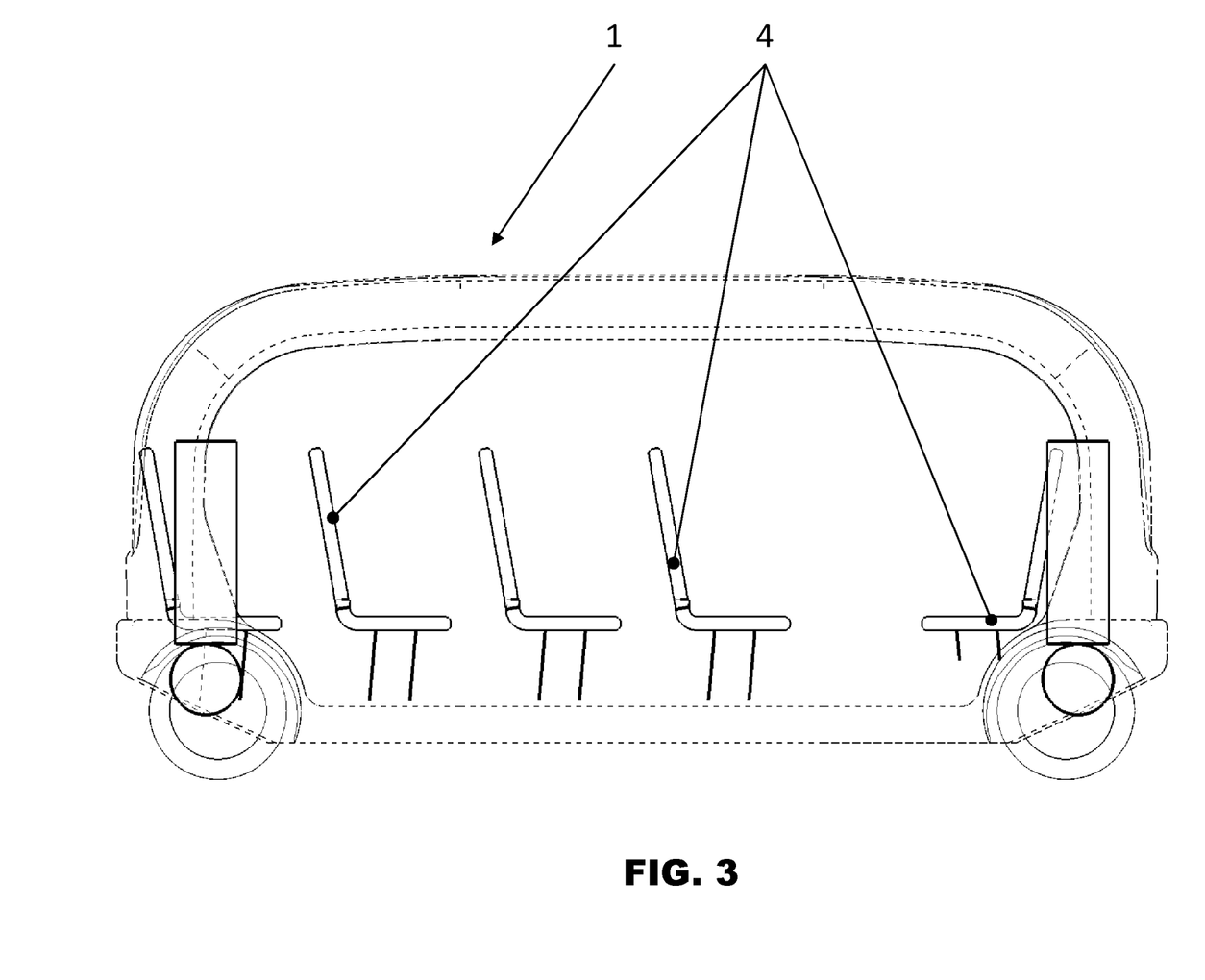
FIG. 3 illustrates a side view of a transport vehicle with a roller blind and seats respectively in a retracted position, in accordance with embodiments.

As illustrated in FIG. 3, a side view of the transport vehicle 1 having seats 4 which moveable between a non-stowed position permitting a passenger to sit thereon, and a space-saving stowed position. The seats 4 may be arranged in or counter to the direction of travel of the transport vehicle 1. The seats 4, however, may also be arranged to be rotatable by 90° to the direction of travel. By way of example, alternatively, embodiments may include seat benches instead of seats 4.

Figure 4:
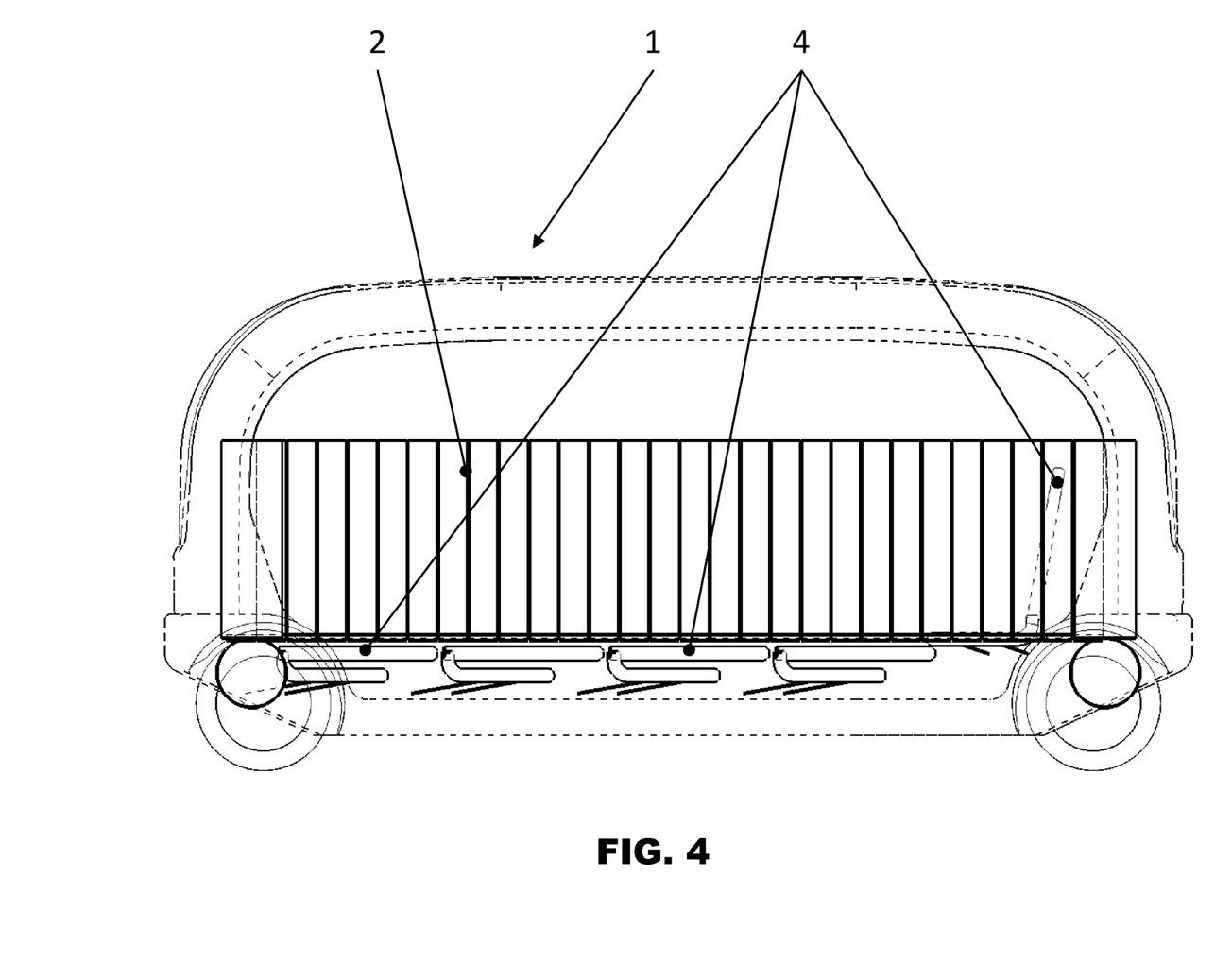
FIG. 4 illustrates a side view of the transport vehicle with a roller blind extended and seats in a space-saving stowed position, in accordance with embodiments.

As illustrated in FIG. 4, a side view of the transport vehicle 1 in which the seats 4 are folded down in a space-saving stowed position and the roller blinds 2 are in an extended position state. Preferably, the backrests and the legs of the seats 4 are able to be folded down via joints. It is possible that the seats are not only able to be folded but are also able to be pulled in and/or retracted and/or folded down. In accordance with embodiments, the seats 4 and the roller blinds 2 may have a common actuating kinematics which permits a simple reconfiguring of the transport vehicle 1 into one of the two usage states.

Figures 5A, 5B:
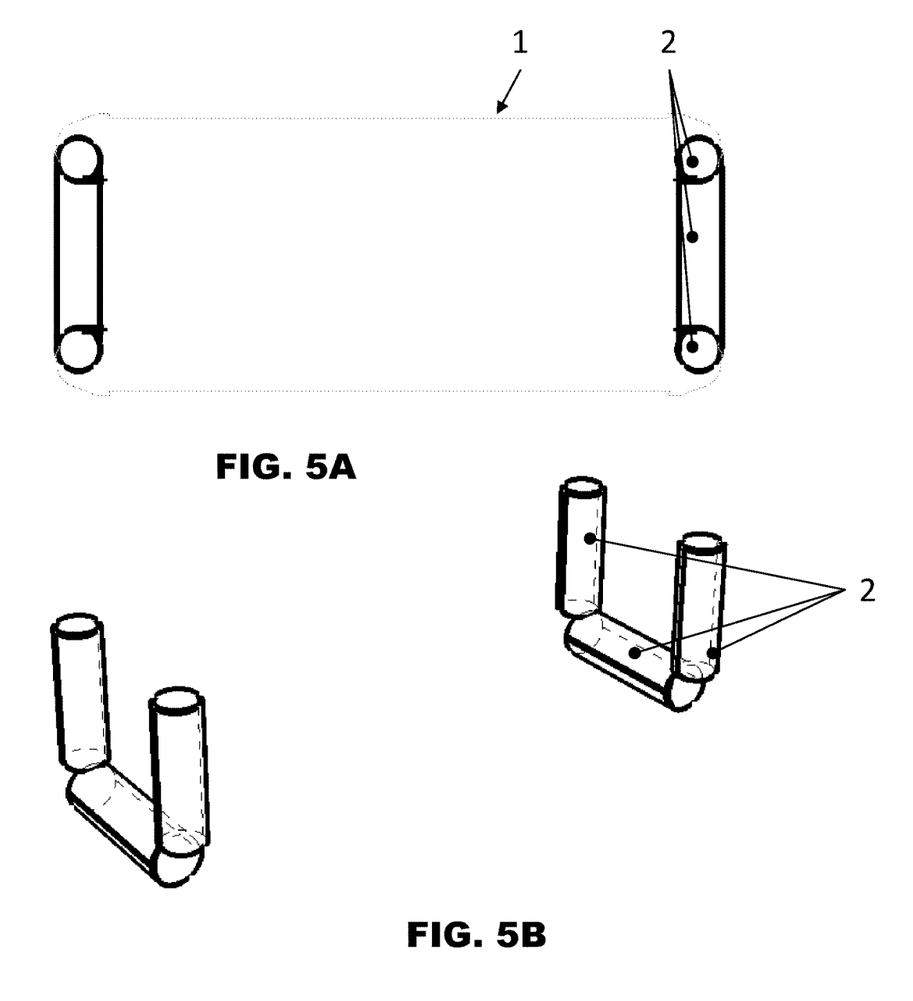
FIG. 5A illustrates a top view of a roller blind in a retracted position, in accordance with embodiments.
FIG. 5B illustrates a perspective view of a roller blind in a retracted position, in accordance with embodiments.

As illustrated in FIGS. 5A and 5B, a pair of spaced apart roller blinds 2 having a cover that is extendable therebetween. In this instance, the cover is in a retracted position/state.

Figure 6A:
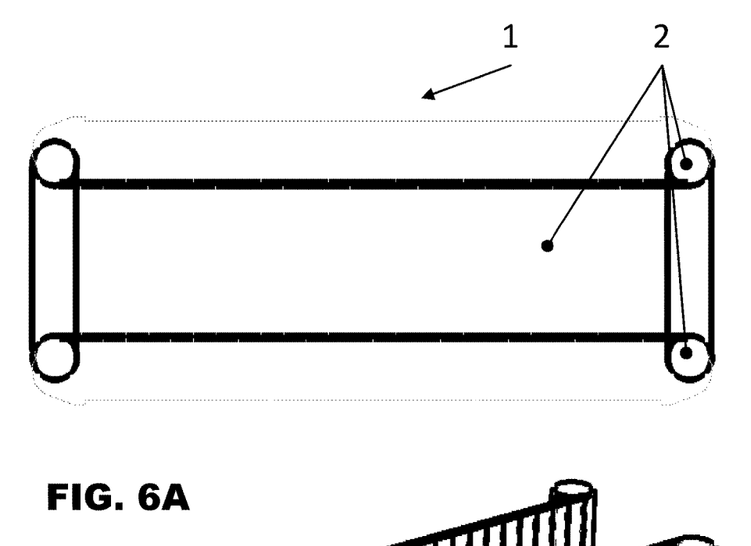
FIG. 6A illustrates a top view of a roller blind in an extended position, in accordance with embodiments.
Figure 6B:
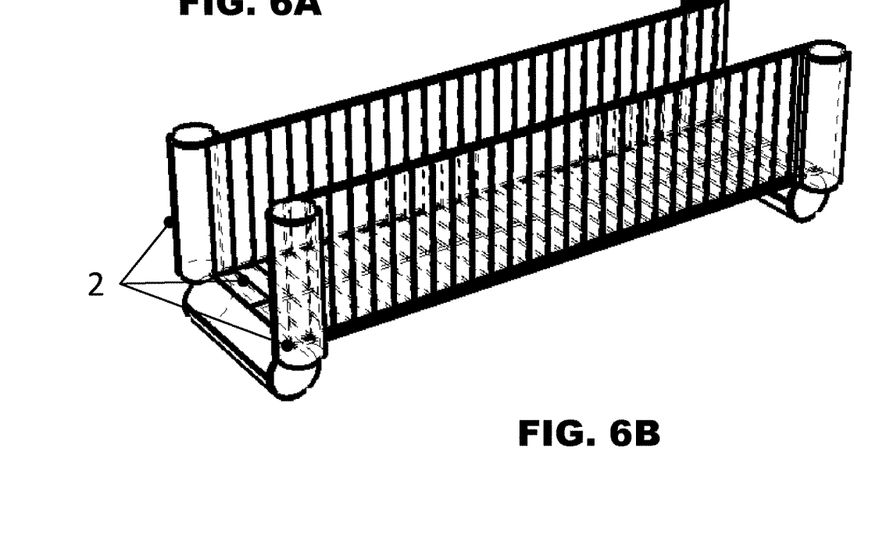
FIG. 6B illustrates a perspective view of a roller blind in an extended position, in accordance with embodiments.

As illustrated in FIGS. 6A and 6B, the cover of the roller blinds 2 is in an extended position/state. The cover may in this case be extended fully out of a winding roller over the entire length of the transport vehicle 1. Alternatively, the cover may be extended from the rear of the transport vehicle 1 and from the front of the transport vehicle 1. For example, the cover may be extended as far as the middle, where the two roller blinds 2 are connected together. The roller blind 2 is configured such that the weight of the goods may be easily carried without damage to the seats 4 located thereunder.

As illustrated in FIGS. 7 through 12B, a second example of a transport vehicle is provided, in accordance with embodiments.

Figure 7:
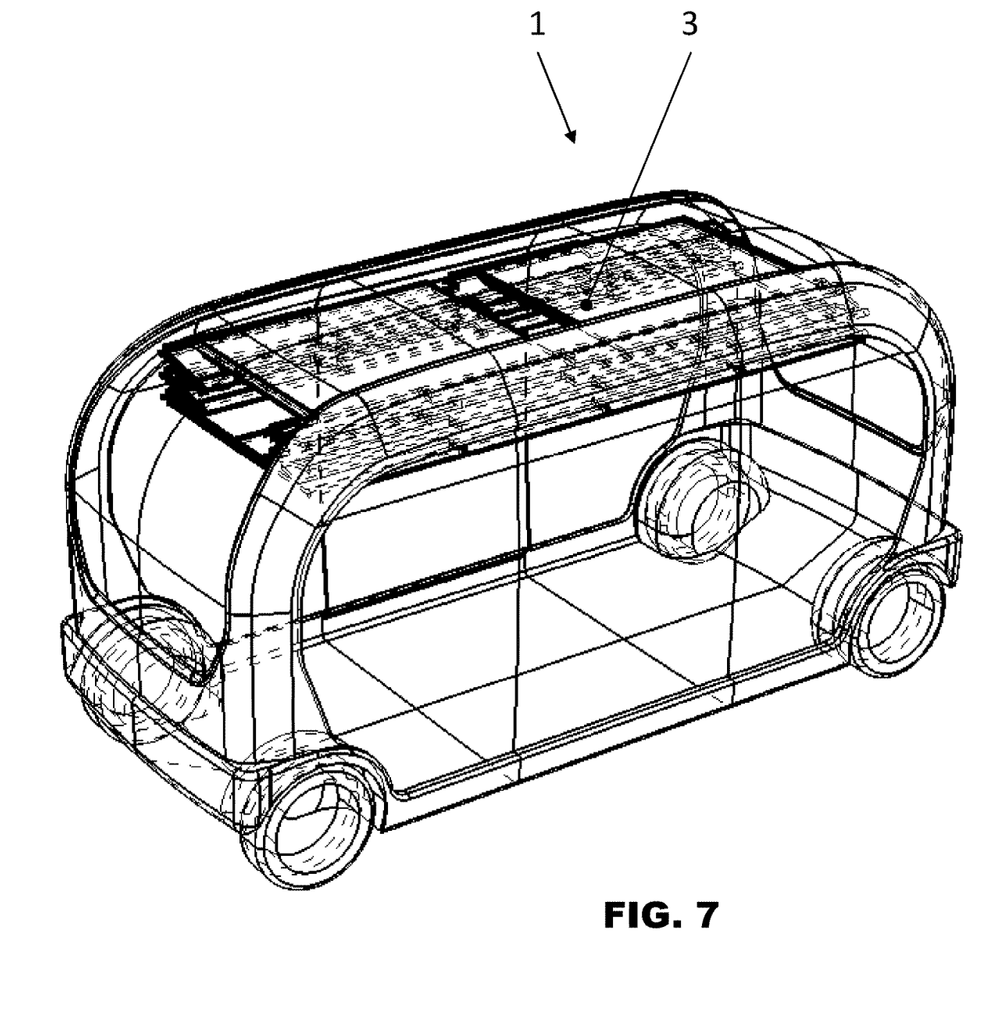
FIG. 7 illustrates a perspective view of a transport vehicle having a folding mechanism in a folded-in position, in accordance with embodiments.

As illustrated in FIG. 7, an alternative embodiment of a cover for a transport vehicle 1 is provided. A folding mechanism 3 is used for the cover, and is arranged (in the collapsed state) in a region of the roof lining of the transport vehicle 1 and retained there via suitable closure elements.

Figure 8:
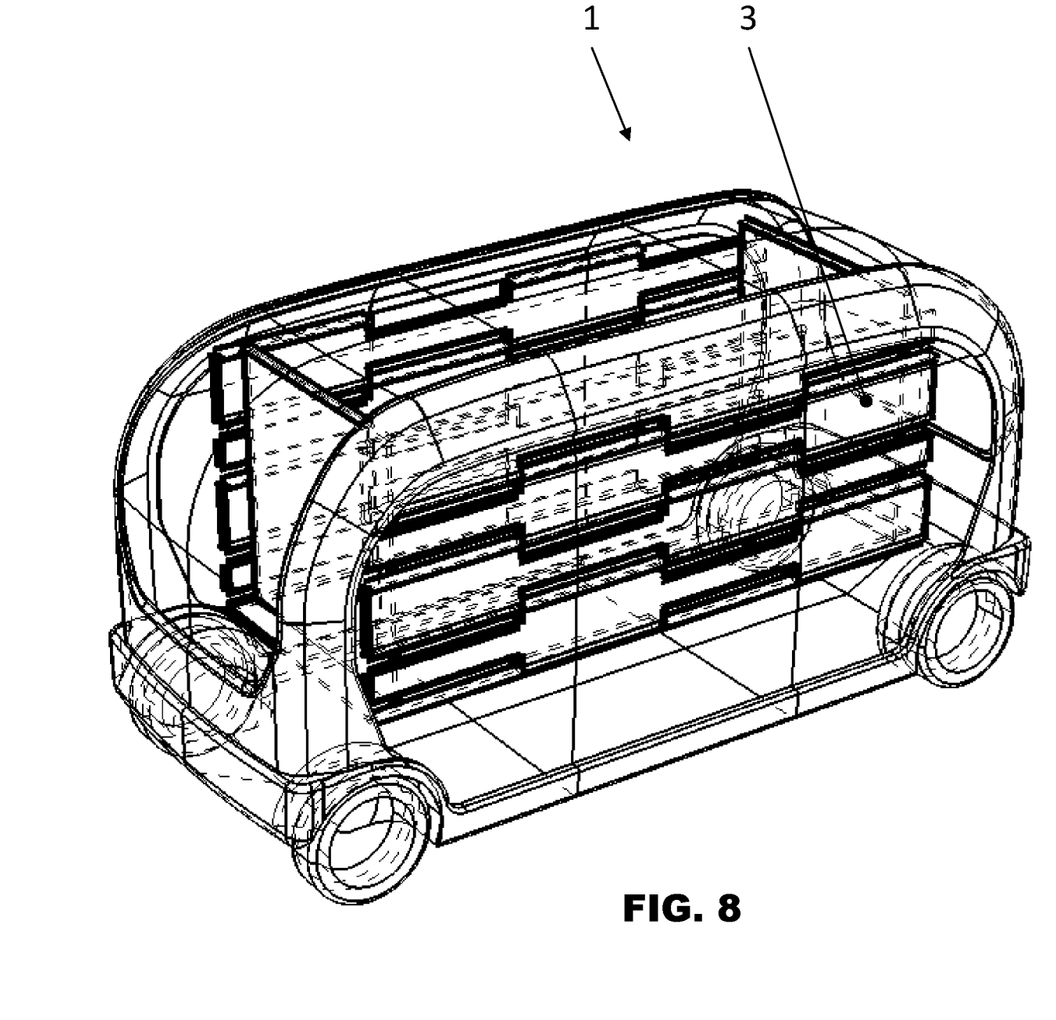
FIG. 8 illustrates a perspective view of a transport vehicle having a folding mechanism in a folded-out position, in accordance with embodiments.

As illustrated in FIG. 8, the folding mechanism 3 is in a folded-out position/state, i.e., with folded-out cover elements. A hollow space is arranged between the floor of the transport vehicle 1 and the floor of the folding mechanism 3, the seats 4 (not illustrated), being arranged folded away therein. The folding mechanism 3 may be connected to the transport vehicle 1, for example, by suitable closure elements.

Figure 9:
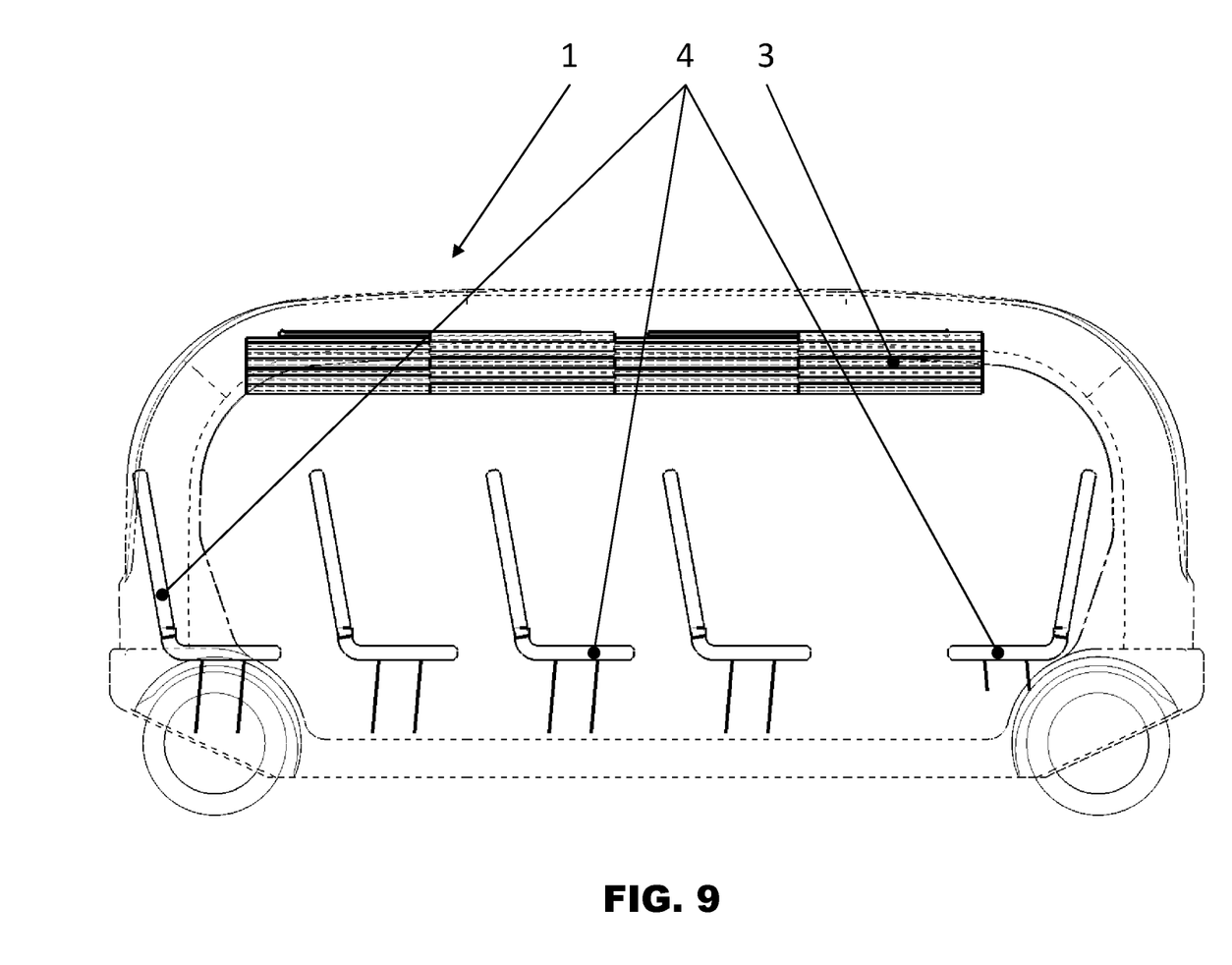
FIG. 9 illustrates a side view of a transport vehicle having a folding mechanism and seats respectively in a folded-in position, in accordance with embodiments.

As illustrated in FIG. 9, the seats 4 of the transport vehicle 1 the seats 4 are in a non-stowed position and the folding mechanism 3 is arranged in the region of the roof lining of the transport vehicle 1.

Figure 10:
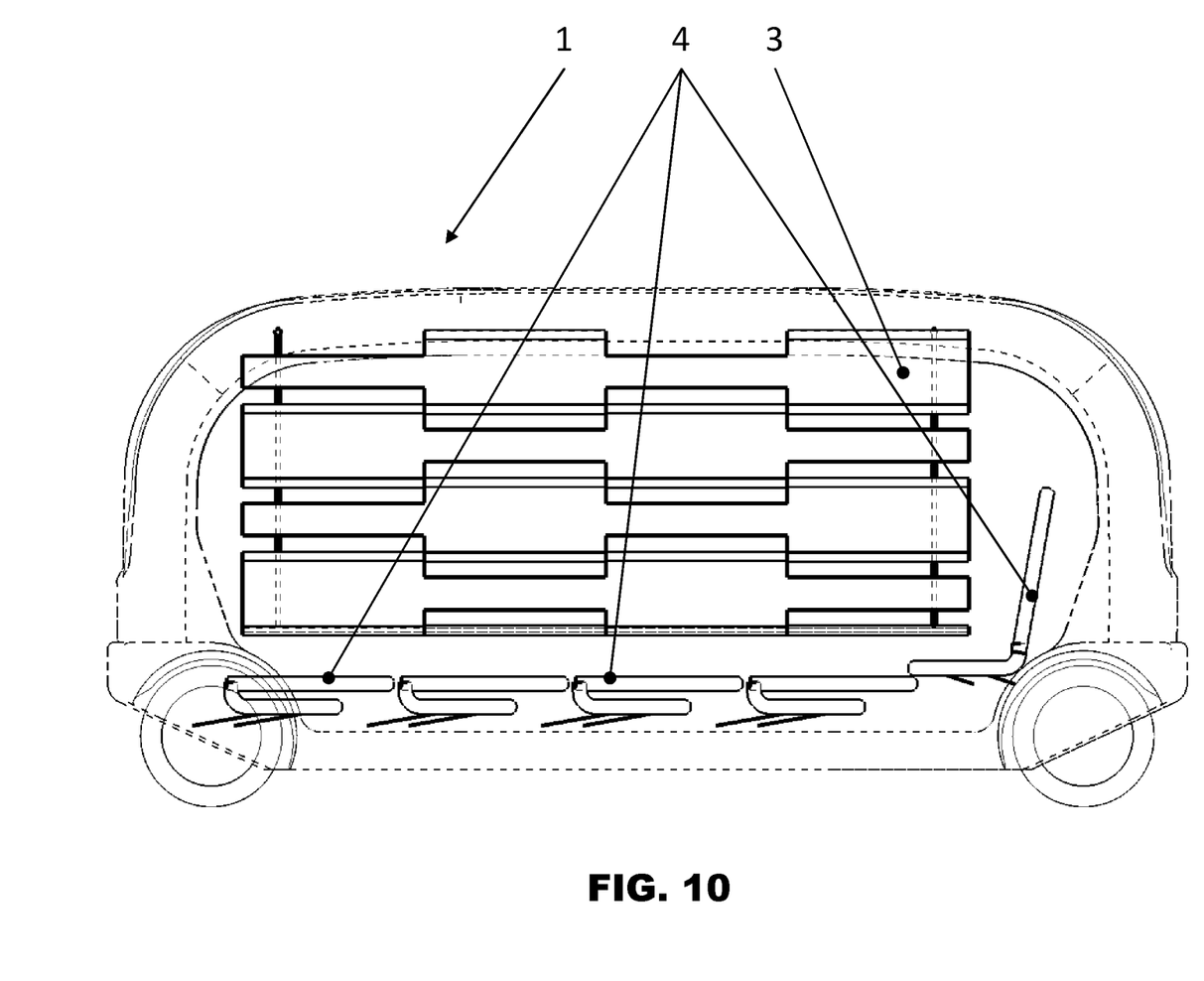
FIG. 10 illustrates a side view of a transport vehicle with a folding mechanism in a folded-out position and seats in a space-saving stowed position, in accordance with embodiments.

As illustrated in FIG. 10, some of the seats 4 of the transport vehicle 1 which are arranged in the region of the folding mechanism 3 are fully folded down, whereas other seats 4 which are arranged outside the folding mechanism 3 are not folded down, or only partially folded down.

Figure 11A:
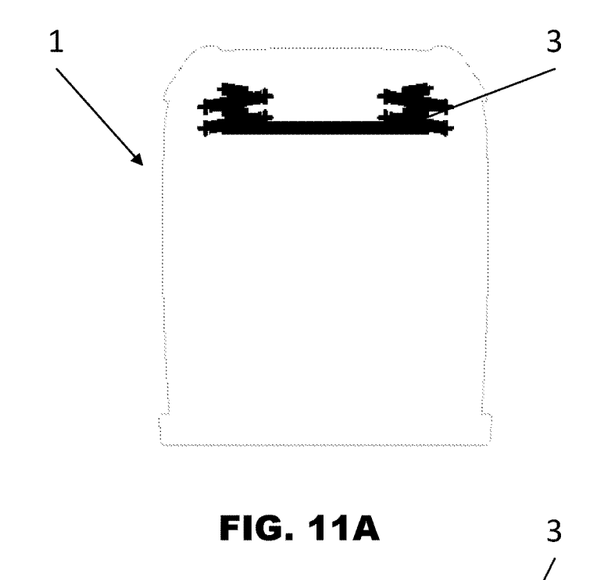
FIG. 11A illustrates a side view of a folding mechanism in a folded-in position, in accordance with embodiments.
Figure 11B:
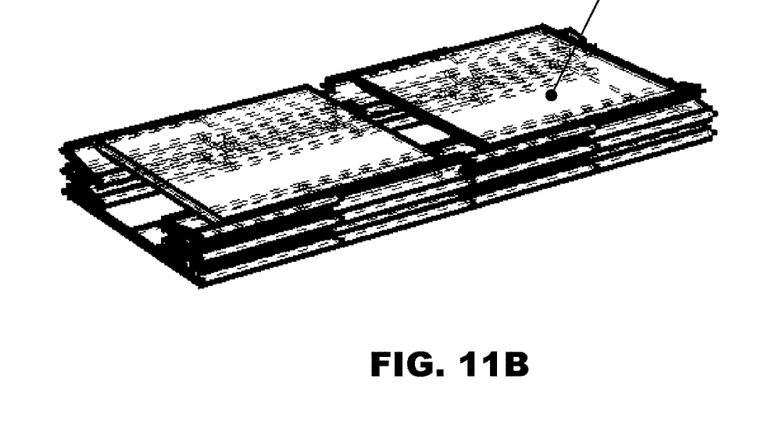
FIG. 11B illustrates a perspective view of a folding mechanism in a folded-in position, in accordance with embodiments.

As illustrated in FIGS. 11A and 11B, the folding mechanism 3 is in a folded-in position/state. The folding mechanism 3 in this case is arranged in a space-saving manner in the region of the roof lining of the transport vehicle 1.

Figure 12A:
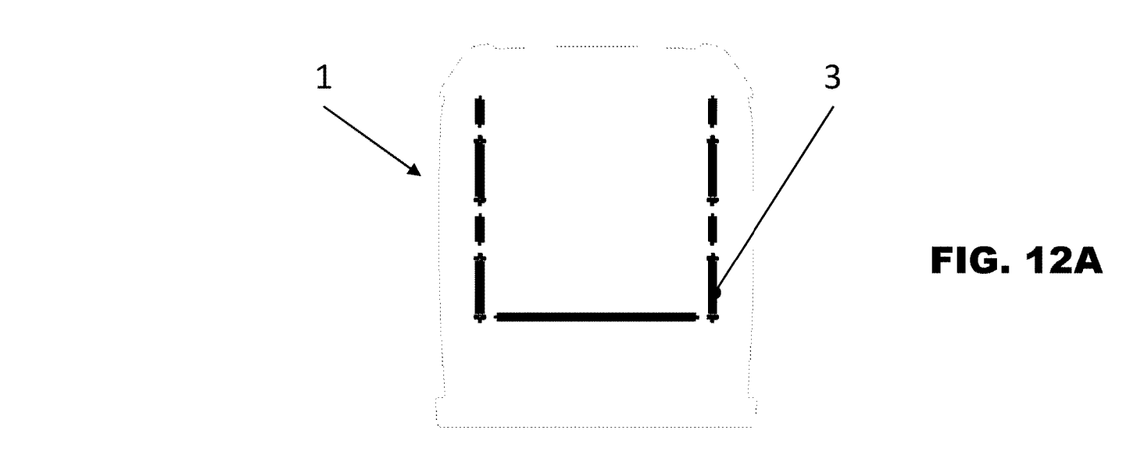
FIG. 12A illustrates a side view of a folding mechanism in a folded-out position, in accordance with embodiments.
Figure 12B:
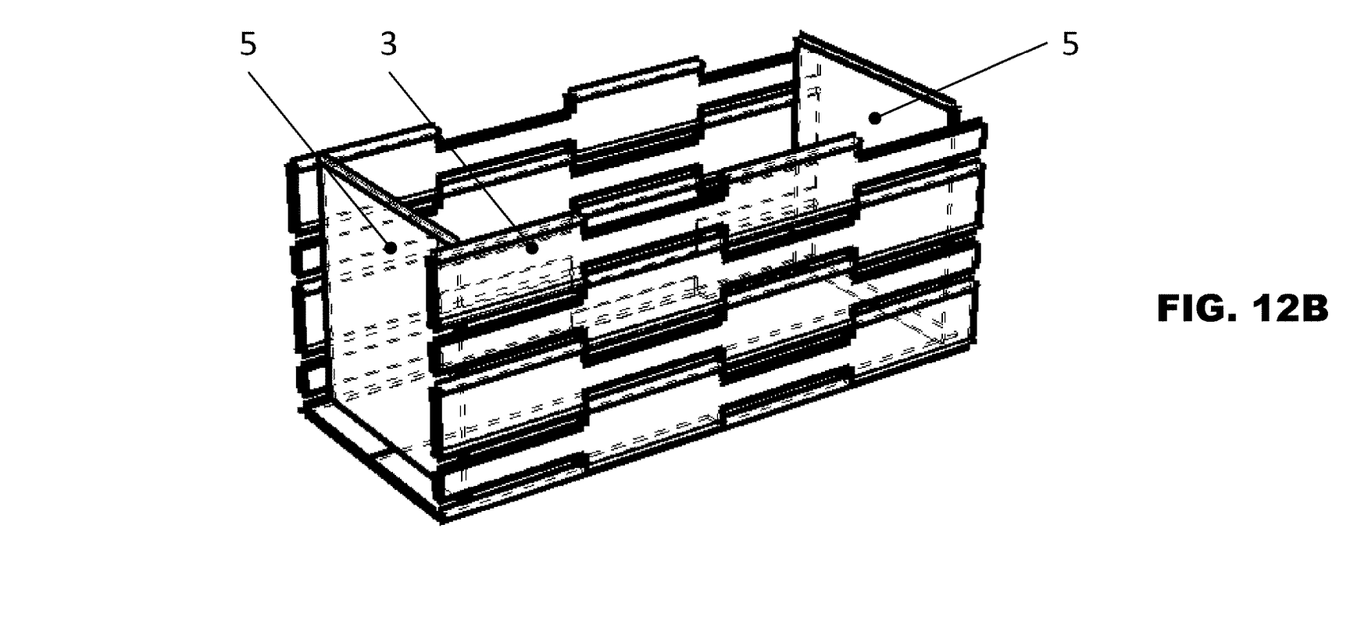
FIG. 12B illustrates a perspective view of a folding mechanism in a folded-out position, in accordance with embodiments.

As illustrated in FIGS. 12A and 12B, the folding mechanism 3 is in a folded-out position/state in a side view from the front. In the folded-out state, the folding mechanism 3 has an additional lining 5 arranged on the front region and the rear region of the transport vehicle 1. The lining 5 is to prevent soiling or damage to the front side wall and rear side wall of the transport vehicle 1. The additional lining 5 is moveable into position by being pivoted downwardly and locked in position on the floor and on the side walls of the transport vehicle 1. Alternatively, the lining 5 may be connected thereto by being plugged into the floor and/or the lateral side walls of the folding mechanism 3. In addition to the function of preventing soiling or damage, the lining 5 also takes on the function of stabilizing the folding mechanism 3.

The terms "coupled," "attached," or "connected" may be used herein to refer to any type of relationship, direct or indirect, between the components in question, and may apply to electrical, mechanical, fluid, optical, electromagnetic, electromechanical or other connections. In addition, the terms "first," "second," etc. are used herein only to facilitate discussion, and carry no particular temporal or chronological significance unless otherwise indicated.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

LIST OF REFERENCE SYMBOLS

1 Transport vehicle
2 Roller blind(s)
3 Folding mechanism
4 Seat
5 Lining

What is claimed is:

1. A motor vehicle, the motor vehicle comprising:
at least one seat to receive passengers thereon, the at least one seat being moveable between a non-stowed position permitting a passenger to sit thereon, and a stowed position to permit a transport of goods; and
a cover, comprising a roller blind, which is moveable between a non-operating position and an operating position to at least partially cover at least one side wall of the motor vehicle and also the at least one seat in the stowed position.

2. The motor vehicle of claim 1, further comprising a floor having a recess to receive the at least one seat when in the stowed position.

3. The motor vehicle of claim 2, wherein a region of the floor of the transport vehicle adjacent to the at least one seat is at least partially covered when the cover is in the operating position.

4. The motor vehicle of claim 2, wherein the cover comprises a separate roller blind for at least one side wall and for the floor region.

5. The motor vehicle of claim 1, wherein the cover is only moveable to the operating position when the at least one seat is in the stowed position.

6. The motor vehicle of claim 1, wherein the cover comprises a folding mechanism arranged, in a non-operating position, in a region of a roof lining of the motor vehicle.

7. The motor vehicle of claim 6, wherein the folding mechanism comprises a plurality of cover side walls and a cover floor.

8. The motor vehicle of claim 6, wherein the folding mechanism is retained via closure elements in the region of the roof lining, and/or in the operating position, in a floor region of the motor vehicle.

9. A transport vehicle, comprising:
a plurality of seats to receive passengers thereon, each seat in the plurality of seats being moveable between a non-stowed position permitting a passenger to sit thereon, and a stowed position to permit a transport of goods; and
a cover, comprising a roller blind, which is moveable between a non-operating position and an operating position to at least partially cover at least one side wall of the transport vehicle and also the seats in the stowed position.

10. The transport vehicle of claim 9, further comprising a floor having at least one recess to receive the seats when in the stowed position.

11. The transport vehicle of claim 10, wherein a region of the floor of the transport vehicle adjacent to the seats is at least partially covered when the cover is in the operating position.

12. The transport vehicle of claim 10, wherein the cover comprises a separate roller blind for at least one side wall and for the floor region.

13. The transport vehicle of claim 10, wherein the cover is only moveable to the operating position when the seats are in the stowed position.

14. The transport vehicle of claim 10, wherein the cover comprises a folding mechanism arranged, in the non-operating position, in a region of a roof lining of the transport vehicle.

15. The transport vehicle of claim 14, wherein the folding mechanism comprises a plurality of cover side walls and a cover floor.

16. The motor vehicle of claim 6, wherein the folding mechanism is retained via closure elements in the region of the roof lining, and/or in the operating position, in a floor region of the transport vehicle.

17. A transport vehicle, comprising:
- a vehicle body having a floor with a recess and a roof with a roof lining;
- at least one seat to receive passengers thereon, the at least one seat being moveable between a non-stowed position permitting a passenger to sit thereon, and a stowed position to permit a transport of goods; and
- a cover, comprising a roller blind, which is moveable between a non-operating position and an operating position to at least partially cover the side walls of the transport vehicle and also the at least one seat in the stowed position, wherein the cover is arranged, in the non-operating position, in a region of the roof lining.

18. The transport vehicle of claim 17, wherein a region of the floor of the transport vehicle adjacent to the seats is at least partially covered when the cover is in the operating position.

* * * * *